United States Patent

Mangold et al.

[11] Patent Number: 5,976,480
[45] Date of Patent: *Nov. 2, 1999

[54] PYROGENIC SILICA, PROCESS FOR THE PRODUCTION THEREOF AND USE

[75] Inventors: Helmut Mangold, Rodenbach, Germany; Dieter Kerner, Midland Park, N.J.; Peter Kleinschmit, Hanau, Germany

[73] Assignee: Degussa-Huls AG, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/689,076

[22] Filed: Jul. 30, 1996

[30] Foreign Application Priority Data

Aug. 18, 1995 [DE] Germany .............. 195 30 339

[51] Int. Cl.$^6$ ................................ C01B 33/12
[52] U.S. Cl. .................................... 423/336
[58] Field of Search ............................ 423/336

[56] References Cited

U.S. PATENT DOCUMENTS 4,108,964  8/1978  Kratel et al. .
4,994,534  2/1991  Rhee et al. .
5,166,227  11/1992  Raimes et al. .
5,342,597  8/1994  Tunison, III .
5,389,420  2/1995  Sextl et al. .

FOREIGN PATENT DOCUMENTS 2620737  12/1977  Germany .
2909815  9/1980   Germany .
2049641  12/1980  United Kingdom .

Primary Examiner—Paul Marcantoni
Attorney, Agent, or Firm—Pillsbury Madison & Sutro LLP

[57] ABSTRACT

Pyrogenically produced silica having a specific surface of less than 90 m$^2$/g, preferably of less than 60 m$^2$/g, and a DBP absorption of less than 60 wt. % (less or equal to 57.30 ml dibutyl phthalate/100 g) is produced by vaporizing silicon halides and/or organosilicon halides, mixing the vapors with a carrier gas, heating the mixture to temperatures definitely above the boiling point of the silicon-halogen compound, mixing with hydrogen and combustion in a known manner in a burner.

3 Claims, No Drawings

PYROGENIC SILICA, PROCESS FOR THE PRODUCTION THEREOF AND USE

This application is based on application no. 195 30 339.3 filed in Germany on Aug. 18, 1995, the content of which is incorporated hereunto by reference.

BACKGROUND OF THE INVENTION

1. Field of the Invention

The invention relates to a pyrogenic silica, the process for the production thereof and uses thereof.

2. Description of Related Art

All highly disperse silicas obtained through the coagulation of monomeric silicas in the gaseous phase at elevated temperature are classed under the term pyrogenic silica (also fumed silica). There are two processes for the industrial production of the pyrogenic silicas, namely high-temperature hydrolysis and the arc process.

In the process involving high-temperature hydrolysis, a homogeneous mixture consisting of vaporous silicon tetrachloride, hydrogen, oxygen and an inert gas undergoes combustion by a burner in a cooled combustion space. In the course of this the following reactions take place simultaneously:

$$2H_2 + O_2 \rightarrow 2H_2O$$

$$SiCl_4 + 2H_2O \rightarrow SiO_2 + 4HCl$$

Owing to the homogeneity of the gas mixture, the reaction conditions and therefore the conditions for formation and growth are largely the same for each particle of $SiO_2$, so that very uniform and even particles can form (Winnacker-Küchler "Chemische Technologie", Volume 2, Anorganische Technologie II, 4th Edition, page 77 (1983)). In the known process air is used as the oxygen source. The pyrogenic silicas produced by the known process have specific surfaces of between 90 and 600 $m^2/g$.

The production of pyrogenic silicas having a lower surface area may require an alteration of the procedure in such a way that the oxygen content of the air used for the reaction is definitely increased by adding further oxygen. By this means the proportion of ballast gas, for example the nitrogen from the air, in the combustion gases is lowered.

This process has the disadvantage that additional gas supply equipment, which is subject to special safety regulations, must be installed for the supply of additional oxygen.

This process moreover has the disadvantage that silicas of low surface area and having in addition a lowered DBP number cannot be produced.

SUMMARY OF THE INVENTION

The object of the invention therefore consists in producing a pyrogenic silica of low surface area and having a lowered DBP number, with no additional oxygen requiring to be used.

The invention provides a pyrogenic silica, which is characterized in that it has a specific surface of less than 90 $m^2/g$, preferably of less than 60 $m^2/g$, and a DBP absorption of less than 60 wt. % (less than or equal to 57.30 ml dibutyl phthalate/100 g).

The invention also provides a process for the production of pyrogenic silica, which is characterized in that silicon halides and/or organosilicon halides are vaporized, the vapors are mixed with a carrier gas, the mixture is heated to temperatures definitely above the boiling point of the silicon-halogen compound, but below the ignition temperature of the mixture, preferably between 200 and 400° C. when $SiCl_4$ is used, the mixture thus heated is mixed with hydrogen, the gases are reacted together in a flame, the hot waste gases and the solid formed are cooled, the waste gases are separated from the solid and any halide residues adhering to the solid are removed by a heat treatment using humidified air.

In a preferred embodiment of the invention, the mixture of air and silicon halide may be preheated close to the end temperature of 450° C. At the same time the hydrogen may be added to the hot mixture of air and silicon halide not until shortly before the mixture leaves the burner nozzle.

The burner device used may be a burner such as is described in the document DE-A 974 793.

The process according to the invention has the advantage that pyrogenic silicas are obtainable which in addition to the low surface area also have low DBP numbers.

The pyrogenic silicas according to the invention can be used as fillers in silicone rubber and plastics, for adjusting the flow behavior of paints and varnishes, as supports for catalysts, as highly pure raw material for the production of quartz, as material for electronic packaging, as raw material for the production of heavily filled solids-containing dispersions.

The pyrogenic silicas according to the invention have the following advantages:

Owing to the low BET surface area and the low DBP number, heavily filled dispersions in water having a solids content of more than 30 wt. % can be prepared using the pyrogenic silicas according to the invention. These dispersions can find application, for example, in CMP (chemical-mechanical polishing) and in polishing silicon discs in the electronics industry.

DESCRIPTION OF PREFERRED EMBODIMENTS

EXAMPLES

Example 1 (Comparative Example)

3 l/h (=4.449 kg/h) of $SiCl_4$ is vaporized and transferred together with 7 $Nm^3/h$ of air and 2.5 $Nm^3/h$ of hydrogen into the mixing chamber of a burner of a known type. The gas mixture flows at a rate of about 28 m/sec (under operating conditions) from the nozzle opening of the burner (burner throat) and burns in the reaction chamber. To this reaction chamber is added 10 $Nm^3/h$ of secondary air (room temperature). The temperature of the gas mixture ($SiCl_4$-air-hydrogen) is measured at the burner throat; it is 85° C.

0.3 $Nm^3/h$ hydrogen (room temperature) is fed into the annular nozzle surrounding the burner throat. Then the silica formed and the waste gas are cooled to about 100 to 130° C. in a cooling system and separated from one another in a filter. Hydrochloric acid residues still adhering are removed from the silica by treatment with humidified air at elevated temperatures. The specific surface of the pyrogenic silica obtained is 110 $m^2/g$. Further analytical data are given in Table 1 and other data regarding the process are given in Table 2.

Example 2

The procedure is as given in Example 1. However, 8.0 $Nm^3/h$ of air and 2.5 $Nm^3/h$ of hydrogen are used. The air-$SiCl_4$ mixture is led through a heat exchanger heated to 450° C. and is heated up in the course of this. The hydrogen introduced into the mixed chamber of the burner is at room temperature. After the addition of hydrogen to the mixing chamber of the burner, a temperature of 327° C. is measured for the SiCl₄-air-hydrogen gas mixture at the burner throat. The gas mixture flows at a rate of about 38 m/sec (under operating conditions) from the nozzle opening of the burner and burns in the reaction chamber. To this reaction chamber is added 10 Nm³/h of secondary air, which has been previously heated to about 150° C. 1.00 Nm³/h hydrogen (room temperature) is fed into the annular nozzle surrounding the burner throat. Following the deacidification by means of humidified air, the specific surface of the silica is 48 m²/g. Further analytical data are given in Table 1 and other data regarding the process are given in Table 2.

No deposits are observed in the ducts supplying gas and in the interior of the burner at the temperatures given in the Examples.

TABLE 1

| Example No. | 1 | 2 |
|---|---|---|
| BET [m²/g] | 110 | 48 |
| pH [4% dispersion] DIN/ISO 787/IX | 4.32 | 4.44 |
| Bulk density [g/l] | 18 | 68 |
| Tamped density [g/l] | 22 | 92 |
| DBP absorption [wt. %] | 253 | 45 |

TABLE 2

Table of the experimental conditions and the flame variables calculated from these in the production of pyrogenic silica of low surface area as in Examples 1 and 2

| | Air | | H₂ | H₂ | | Charge | Ratio | | Flow | Flow |
|---|---|---|---|---|---|---|---|---|---|---|
| No. | Primary [Nm³/h] | Secondary [Nm³/h] | Primary [Nm³/h] | Mantle [Nm³/h] | SiCl₄ [l/h] | Me vapor [g/Nm³] | H₂ gamma [-] | O₂ lambda [-] | standard [m/sec] | operation [m/sec] |
| 1 | 7.00 | 10.00 | 2.50 | 0.30 | 3.0 | 440.3 | 2.16 | 1.17 | 21.1 | 27.7 |
| 2 | 8.00 | 10.00 | 2.50 | 1.00 | 3.0 | 400.5 | 2.16 | 1.34 | 17.4 | 38.3 |

Abbreviations:
Air, Primary = primary air mixed with SiCl₄ vapor, Secondary = secondary air; Charge Me vapor = charging of the air-gas mixture with metal halide vapor SiCl₄; Ratio, H₂ gamma = ratio of hydrogen introduced in the core (burner) to stoichiometrically required hydrogen; Ratio O₂ lambda = ratio of oxygen introduced (of the air) in the burner to the stoichiometrically required oxygen; Flow standard = rate of gas discharge at the burner throat referred to standard conditions (273 K, 1 atm); Flow operation = rate of discharge referred to operating conditions.

What is claimed is:

1. A process for production of pyrogenic silica comprising:

a) vaporizing a silicon halide, b) mixing the vapors with a carrier gas comprising air to form a mixture, c) heating the mixture to a temperature above the boiling point of the silicon halide compound, said temperature being between 200° and 400° C., d) introducing hydrogen into the mixture and mixing, e) reacting the gas mixture in a flame to form a solid and waste gases, f) cooling the hot waste gases and the solid, g) separating the waste gases from the solid, and h) removing any halide residues adhering to the solid by heating in humidified air.

2. A process according to claim 1, wherein said process produces a pyrogenic silica having a specific surface or less than 90 m²/g and a DBP absorption of less than 60 wt. % and less than or equal to 57.30 dibutyl phthalate/100 g of solution; wherein said pyrogenic silica forms a dispersion in water having a solids content of greater than 30 wt. %.

3. A process according to claim 1, where said process produces a pyrogenic silica wherein the specific surface is less than 60 m²/g.

* * * * *